Jan. 15, 1952 W. F. KIPPLE 2,582,635
FOLDING CAMP TRAILER

Filed Aug. 4, 1947 3 Sheets-Sheet 1

INVENTOR.
William F. Kipple
BY
Reynolds Beach
ATTORNEYS

Jan, 15, 1952 W. F. KIPPLE 2,582,635
FOLDING CAMP TRAILER
Filed Aug. 4, 1947 3 Sheets-Sheet 3

INVENTOR.
William F. Kipple
BY
Reynolds & Beach
ATTORNEYS

Patented Jan. 15, 1952

2,582,635

UNITED STATES PATENT OFFICE 2,582,635

FOLDING CAMP TRAILER

William F. Kipple, near Seattle, Wash.

Application August 4, 1947, Serial No. 765,903

4 Claims. (Cl. 296—23)

Notwithstanding the comparatively spacious and elaborately equipped house trailers which are presently available, or the simple trailer bodies which serve merely as conveyances for individual items of camping equipment, and notwithstanding even the foldable trailers intermediate the two extremes mentioned, there is still an unsatisfied demand for a trailer which may be folded to small bulk for traveling, and which yet can be readily and quickly set up or unfolded into a position where it will offer something more than a minimum of space for sleeping or shelter in inclement weather, and which will afford a certain minimum of kitchen accommodations as well, with all such accommodations conveniently located and adapted to the needs and conditions of use to be expected along the road. It is the primary object of the present invention to provide a trailer better adapted to the satisfaction of such requirements than any trailer known to me.

The provision of sleeping accommodations with some appreciable headroom, at least in part, is very desirable, but ordinarily is incompatible with the desire for small size while traveling, particularly if such sleeping accommodations, as desirably they should be, are upraised above the ground, for the sake of safety and protection against small animals or damp ground. Yet, unless the trailer is foldable, to eliminate the desired headroom while traveling, the trailer becomes so bulky that it produces undue air resistance and drag for towing, and it obstructs the view of the driver in his usual rear-view mirror. Foldable trailers are known, but usually are so complicated to unfold and fold again that their inconvenience in such respect outweighs their desirability in respect to their compactness while traveling. The provision of a folding trailer of such simplicity and convenience that it has all the advantages, and few if any of the disadvantages indicated, is a further object of the invention.

The sleeping accommodations are used only at night, yet the traveler often will desire to have access to kitchen accommodations without the necessity of disturbing the sleeping accommodations, and perhaps without the necessity of raising the cover which gives headroom over the sleeping accommodations. Berths whereon to sleep need be of no appreciable height in themselves, though they are preferably elevated well above ground level, yet the kitchen accommodations, if they are to be concentrated at the entrance for ready availability, are desirably of some appreciable height, and hence it is a further object of the invention to provide in a trailer having sleeping accommodations elevated above the ground kitchen accommodations which are accessible without disturbance of the sleeping accommodations, which have adequate height, and which at the same time afford as much ground or road clearance as is required by other portions of the trailer. Moreover, it is an object to provide such kitchen accommodations in a trailer of this sort which can be accessible by a person on the ground and with a minimum of opening of the trailer itself.

In some trailers of the folding sort it may be a simple matter to open the trailer itself, but in order to secure adequate closure and protection against the elements and for privacy, it is necessary to perform the tedious task of affixing curtains and the like. Conversely, in folding the trailer these curtains must be removed and stowed, sometimes in inclement weather. It is an object of the present invention to provide curtains and extension elements which are normally attached and left attached to the trailer and its cover, which will quickly fold inside in such manner as to add to the protection afforded by the trailer cover, and which, upon opening of the cover, will almost automatically fall into their intended operative positions, to the final end that the setting up of the trailer requires little more than the opening of the cover, and its folding is correspondingly simple.

Other objects, and especially such as pertain to details of manufacture, construction, and arrangement, will appear more fully as this specification progresses.

The invention comprises the novel folding camp trailer, and the novel combination and arrangement of the parts thereof, such as is shown in the accompanying drawings in a preferred form, and as will be hereinafter more fully described and claimed.

Figure 1:
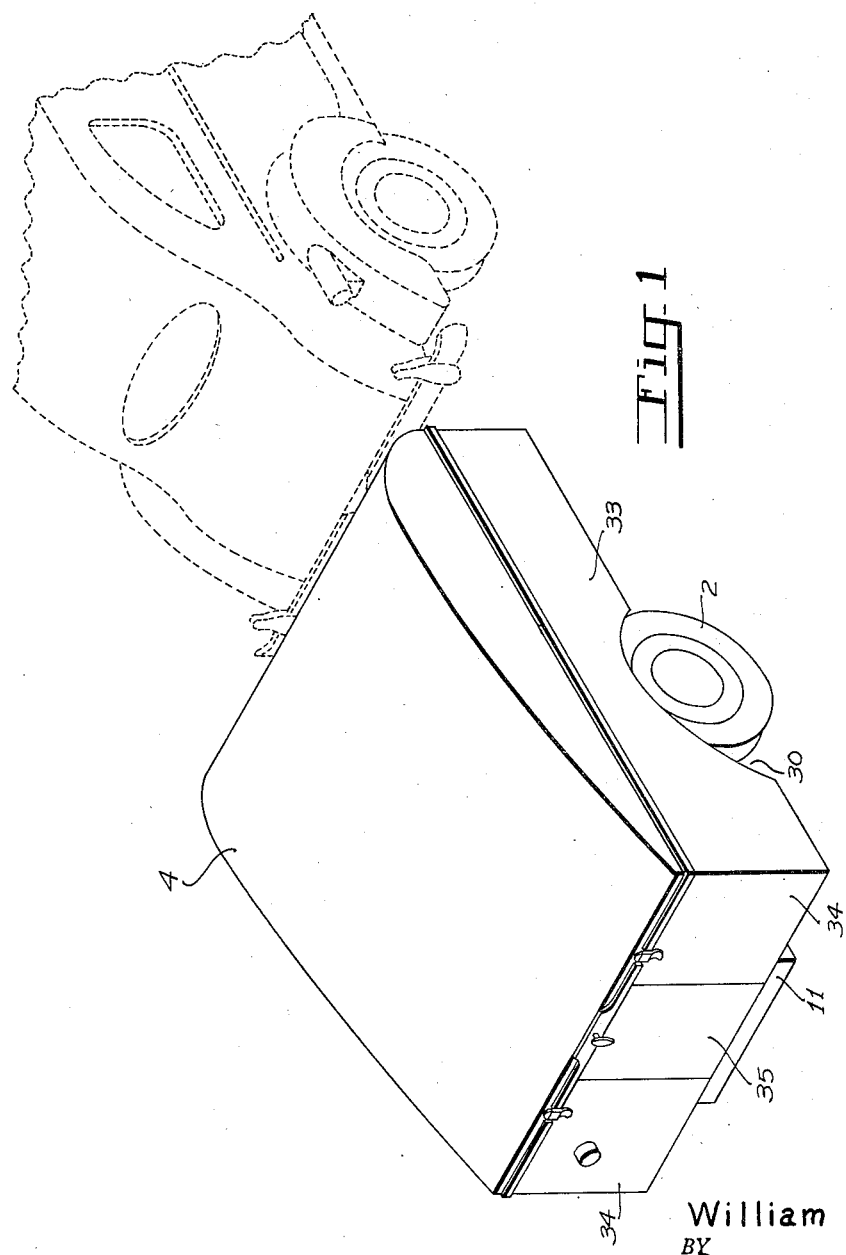
Figure 1 is an isometric view of the trailer folded and ready for the road, in position relative to a tractive car.

The trailer includes a frame 1, suitably braced, mounted in any conventional manner upon the wheels 2, upon the axle 20. Usually springs 21 will be interposed between the axle and the frame 1. At its forward end the frame is provided with a trailer hitch 10, by which the trailer is towed, and at its rear end, for a purpose which will shortly appear, the frame has a drop portion 11, which extends downwardly to about the same level as the bottom of the axle 20. In other words, the drop portion of the frame will clear any obstacle which the axle 20 ahead of it will clear, but otherwise the frame at the rear extends downwardly to as low a point as is consistent with the above.

Mounted upon the frame 1, 11 is a box-like body, including the floor 3, 31, the front wall 32, the side walls 33, rear wall sections 34, and a rear door 35, which may be hinged to one of the sections 34 and be latched with respect to the other. Within the body may be formed wheel wells 30 for reception of the wheels 2, so that the side walls 33 are disposed somewhat outside the wheels themselves, to afford the maximum allowable width, within desired limits, to the space within the trailer.

Mounted upon the body, and preferably hingedly mounted at 40 along the upper edge of the front wall 32, is a cover 4, which is of a width and length such that when lowered it will just cover over the side walls 33 and the rear walls 34, 35. It may be bulged upwardly somewhat, particularly in its forward portion, but preferably it does not in any part extend upwardly so high that when folded down it will obscure the view of the driver in his rearview mirror as he observes the road behind through the rear window of the automobile body. This will be readily understood by reference to Figure 1 of the drawings. When swung upwardly, however, to an appreciable angle, the cover 4 covers over most of the space within the body, and affords adequate headroom, at least within the rearward portion thereof. The cover may be held thus upraised by any suitable means, but preferably by means of the telescopic strut 41, 42, and the locking dog 43, with which strut is associated the compression spring 44 which assists in raising the cover. This strut is located centrally within the forward portion of the body, in a manner which will be more particularly described hereinafter.

Figure 2:
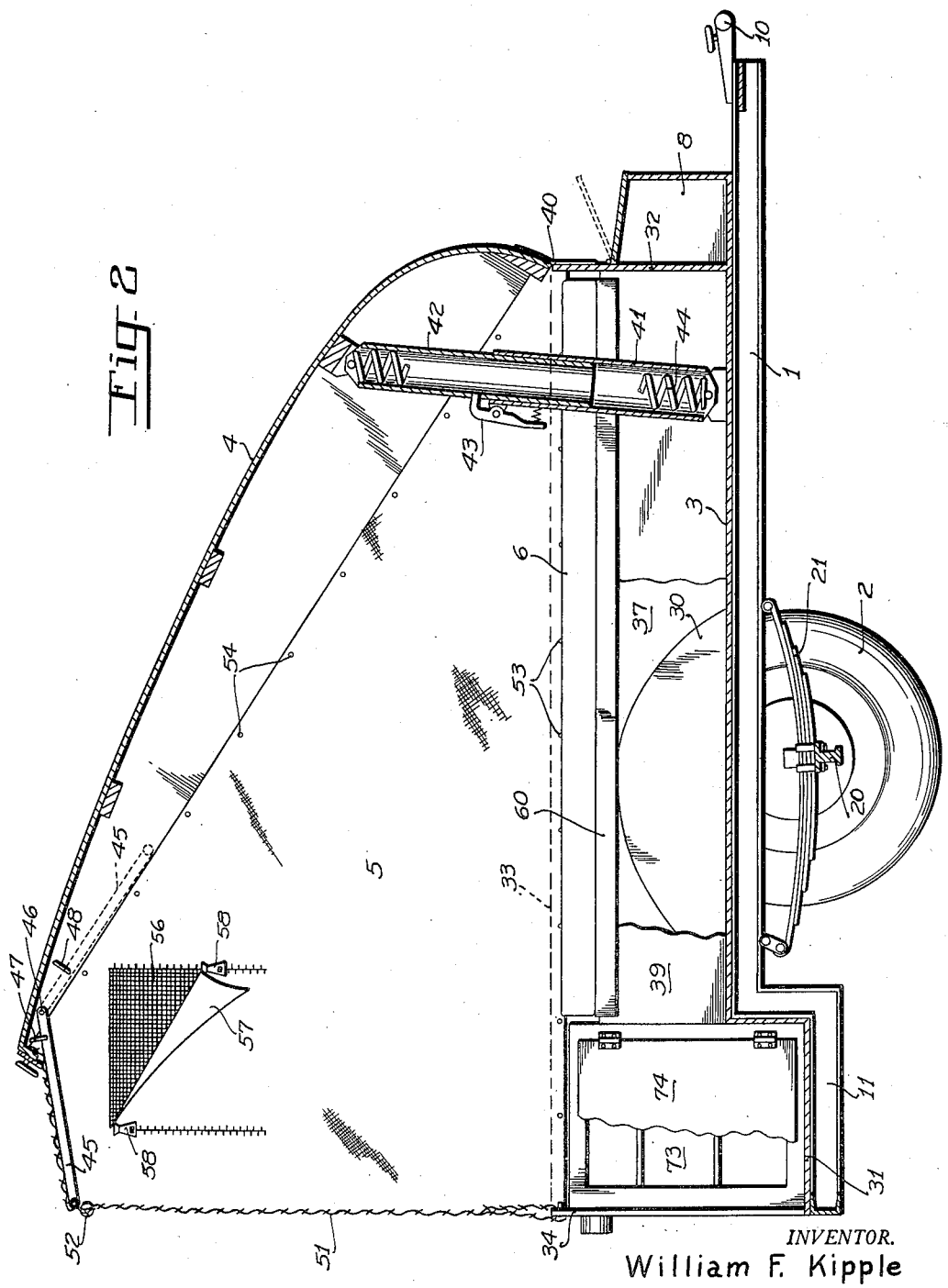
Figure 2 is a longitudinal sectional view through such a trailer, in its open or set-up position.
Figure 3:
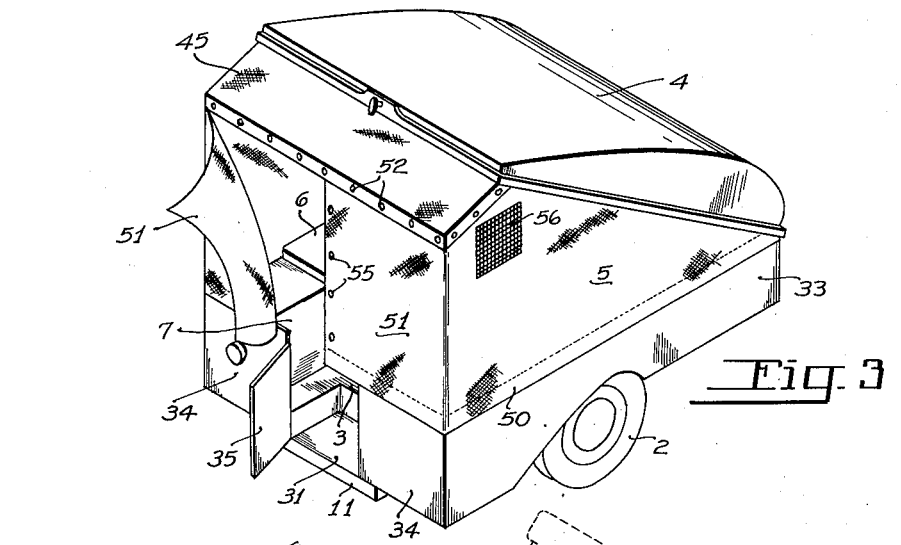
Figure 3 is a view similar to Figure 1 of the trailer alone, showing the same set up, with a curtain opening to the interior.
Figure 4:
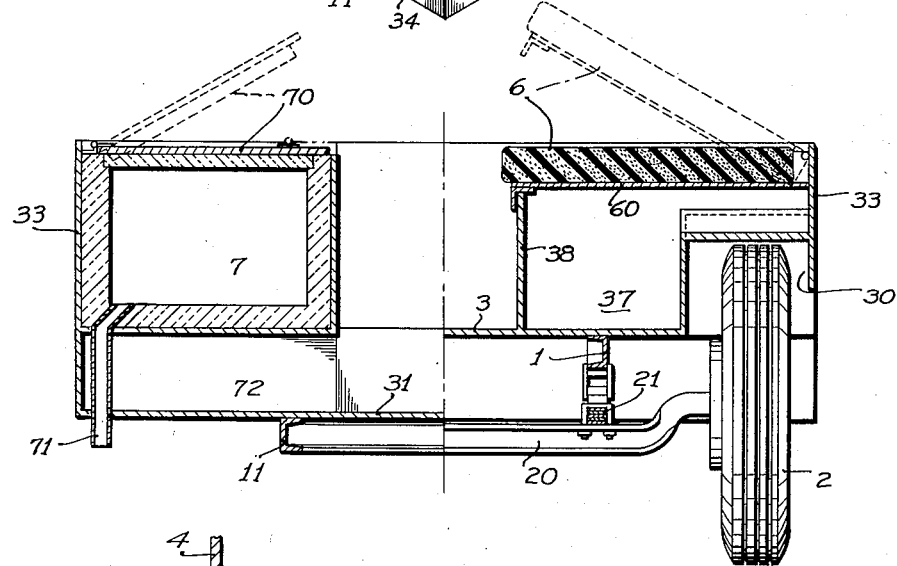
Figure 4 is a transverse sectional view, taken in part through the kitchen accommodations, and in part through the sleeping accommodations, illustrating the interior arrangement of the parts of the trailer.

By reason of the upward swing of the cover its rear edge, when upswung, lacks by a certain amount in affording coverage to the rear portion of the space within the trailer body, and since this space is that which includes the kitchen accommodations, which should be adequately protected from weather, it is preferable that the same be closed in when the cover is upraised. To this end I provide a flap 45, hingedly mounted within the cover at 46 on an axis disposed transversely of the rear edge of the cover, which flap is held upraised by latches 47 or in its retracted position, swung inside of the cover, by latches 48 (see Figure 2). This flap 45 may consist simply of a framework with a canvas or fabric cover, but it is permanently though movably secured in position. When extended, its rear edge overlies the rear wall 34, 35 of the body, and when retracted it lies beneath the cover 4, and wholly above the upper edges of the walls which define the body, as shown in dotted lines in Figure 2. In its rearwardly extended position the flap 45 preferably slopes somewhat rearwardly for run-off of rain water.

Figure 5:
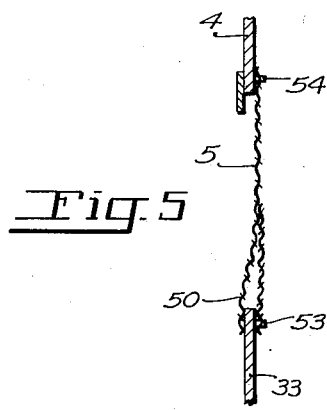
Figure 5 is a detail sectional view showing a preferred manner of connection of the curtains to the cover and to the trailer body.

The cover and its flap 45 afford adequate overhead coverage, with good headroom, at least in the rearward portion of the trailer. However, for protection against driven drain, and for privacy, side curtains and end curtains are desirable. I therefore provide side curtains 5, which are permanently, or at least semipermanently, attached to the inside of the side wall portions of the cover 4, as indicated at 54, and which in similar fashion are secured to the side walls 33 of the body, as indicated at 53. The securing means at 53 and 54 may be dot fasteners or the like, by means of which the curtains can be removed for repair or replacement, or for cleaning, whenever this is desirable, but ordinarily the curtains are left permanently attached to the cover and to the side walls of the body. In similar fashion the attachment to the flap at 45 may be semipermanent in nature. As the typical section of Figure 5 shows, a storm flap 50 on the curtain hangs down outside the body wall 33 for drainage of rain water outside, rather than inside, the body.

The rear curtains 51 are somewhat similarly secured to the flap 45, as indicated by the fasteners at 52, and also to the rear walls 34. In addition the rear curtains 51 may be secured to one another by the quick-releasable securing means indicated at 55. For convenience it is preferred that the rear curtains 51 be permanently joined to or be an extension of the vertical rear edge of the side curtains 5. The rear curtains 51 may be left permanently attached to the flap 45, and indeed may be left semipermanently attached to the rear wall sections 34. For ventilation the side curtains or the rear curtains, or both, may be provided with window openings, and to illustrate the same, openings have been shown in the side curtains 5 closed by the netting at 56, and additionally capable of closure against driven rain by the closures 57 held in place by the slide fastener means illustrated at 58.

The interior arrangement of the trailer and its accommodations are of appreciable importance in carrying out the objects of the invention. For sleeping accommodations I provide two berths, typified by the mattresses 6, elevated above the floor 3 of the body, and extending preferably lengthwise along each side of a central passageway 39, defined by the upright partitions 38. These berths may be further constituted by shelves 60 hingedly connected at their outer edges to the side walls 33, thus to define storage lockers 37 occupying the entire space beneath the berths, except such as is taken up by the wheel wells 30. These berths, being located in the central and forward portion of the body, need have only a minimum of headroom in their forward portion, where the feet of the sleeper will be, yet are given adequate headroom in the rearward portion, where the cover 4 swings upwardly to its greatest extent. The passageway 39 affords good access to all parts of each berth, for making it up, and for access to the lockers 37, and yet the berths are elevated above the floor 3, and, of course, are elevated well above the ground. The strut 41, 42, which holds the cover elevated and assists in raising it, is located within the passageway 39, but since it is at the forward portion of this passageway, it interferes to the least degree with the use of the passageway and with storage of articles, such as suitcases of clothing, within the passageway.

The sleeping accommodations need to be freely and fully accessible only at night, when the trailer is no longer traveling and when the cover is raised. The kitchen accommodations, however, must be accessible not only at such times, but also not infrequently during the middle of the day, when the vehicle is only temporarily halted. Moreover, such kitchen accommodations require rather more vertical height than is conveniently afforded between the floor 3 and the cover 4, for otherwise they would occupy more of the trailer's length than is desirable, and by so much would be difficult of access. It is for the accommodation of this vertical height that the frame has been dropped at 11, and that this dropped portion is located at the rear of the trailer.

Such kitchen accommodations may consist, for instance, of an icebox 7, with its top-opening cover 70 and its drain 71, of the space 72 beneath the icebox, which may serve for stowage of a gasoline camp stove, and of the food and utensil locker 73, with its side opening cover 74. It is immaterial whether the food locker be located at the left, or whether the refrigerator be located there, and alternative locations have been shown in the drawings. Both, however, are located in the drop-frame rear portion of the trailer, and each occupies substantially the entire height from the floor section 31 to the upper level of the side and rear walls of the trailer body, but do not extend appreciably above the latter. The kitchen accommodations are divided, so that they do not obstruct the passageway 39, and thus, in addition to affording ready access to the sleeping accommodations through the kitchen section, they may be individually gotten at by merely swinging open the rear door 35. Thus by raising the cover 4 sufficiently to open the rear door 35, or by arranging the rear door so that it may be opened without raising the cover, access may be had to the kitchen accommodations for the preparation of a noonday meal or the like, while temporarily halted. On the other hand, if the weather is bad, the cover may be raised, and the trailer opened out, and cooking may be accomplished within the shelter afforded by the side and rear curtains and the top and flap 45.

Since the side curtains 5 are preferably left secured to the side walls 33 and to the cover 4, these side curtains may be folded inwardly over the kitchen and sleeping accommodations, as the cover is closed down over the latter. Now when the cover is raised and the flap 45 is swung outwardly, the side curtains 5 are thereby stretched taut, and come into their operative positions. If the rear curtains 51 are similarly left attached, they, too, will come into operative position by the raising of the cover and the outswinging of the flap 45. Alternatively the rear curtains 51 may be detached from the cover and from the body, and simply folded inwardly with the side curtains 5, to lie between the cover and the kitchen and sleeping accommodations, respectively, and when the cover is swung upwardly and the flap swung outwardly, the rear curtains 51 may be very readily attached to the flap and to the body, or may be left swung inside the side curtains. As an alternative arrangement the rear curtains 51 may be secured to the rear edge of the flap 45, and may be separable from the side curtains, to the end that while they may be secured along the vertical rear edge of the side curtains for privacy, they may, if desired, be swung upwardly and rearwardly as an awning-like extension of the flap 45, under the shelter of which awning cooking operations may be carried out.

The closing of the trailer, or its opening out into full shelter position, either one, is a matter of but a moment, and in inclement weather the traveler does not become wet in the operations of setting up the trailer or taking it down, for by reason of its construction and arrangement the trailer is capable of being set up or taken down in inclement weather without inconvenience to the operator himself, nor disturbance of the accommodations within the trailer. Ample space is provided when needed, and yet the over-all height of the trailer is small and it does not interfere with the driver's vision, nor produce undue drag on the tractive vehicle.

For carriage of tools and the like, such as are frequently useful and sometimes unexpectedly needed on such a trip, and which are not harmed by the weather, an external locker 8 is provided upon the frame 1, ahead of the body 3.

I claim as my invention:

1. A trailer structure affording at its respective ends sleeping and kitchen compartments, comprising a wheel-mounted body having a floor arranged at two levels, that in the sleeping compartment being at an upper level to clear the wheel mounting, and that in the kitchen compartment being dropped to a lower level, a bed structure installed above the floor in the sleeping compartment, said body including also side walls and transverse end walls rising only to a height, generally common to all walls, to clear the bed structure, a door in the one end wall admitting to the kitchen compartment, kitchen structures installed in the kitchen compartment, and terminating at no greater height than the several walls, a hood-like roof hingedly mounted upon a transverse axis to the transverse end wall at the end of the sleeping compartment, and coinciding in its lowered, generally horizontal position with the edges of the several walls to constitute a low, tight closure for traveling, but tiltable upwardly from its hingedly mounted end to form a partially covered kitchen space of a height to permit standing upon the dropped floor, and slanting downwardly over the sleeping compartment from about that height to the height of the end wall only, to form a covered sleeping space of a height to preclude standing upon the raised floor, means to support the roof thus upraised, an extension roof section mounted adjacent the swinging end of the roof, for movement between a traveling position wherein it is wholly beneath the roof, to an extended position wherein it projects rearwardly from the roof's rear end to complete the covering of the kitchen space, at a level to permit standing therein, and curtains removably secured between the side and swinging end edges of the roof, including said extension section, and the corresponding edges of the body's walls, to house in, and for access to, the interior of the body by way of the door in the end wall which admits to the kitchen compartment, said curtains folding inwardly to rest upon the bed and kitchen structures when the roof is lowered, for traveling.

2. A trailer structure as in claim 1, wherein the roof's extension section is hingedly mounted across and beneath the swinging end edge of the roof, for swinging inwardly to folded or traveling position wholly beneath the roof.

3. A trailer structure as in claim 2, characterized in that the curtains are secured to the swinging end and the side edges of the extension section, as well as to the upper edges of the walls, and are automatically drawn taut by the positioning of the extension section in its extended position, and are likewise folded inwardly by the swinging of the extension section to its folded position.

4. A trailer structure as in claim 1, wherein the means to support the roof upraised is formed as a two-part, telescoping strut, extending substantially vertically between the raised portion of the floor and the roof in the region of minimum head-room, adjacent the hinged end of the roof.

WILLIAM F. KIPPLE.

REFERENCES CITED

The following references are of record in the file of this patent:

UNITED STATES PATENTS

| Number | Name | Date |
| --- | --- | --- |
| D. 149,702 | Smith | May 18, 1948 |
| 1,734,803 | Gable | Nov. 5, 1929 |
| 1,857,081 | Fontaine | May 3, 1932 |
| 1,945,089 | Small et al. | Jan. 30, 1934 |
| 2,119,154 | Downing | May 31, 1938 |
| 2,168,661 | Anderson et al. | Aug. 8, 1939 |
| 2,225,993 | Hornberger | Dec. 24, 1940 |
| 2,329,419 | Reed | Sept. 14, 1943 |
| 2,353,820 | Eddins | July 18, 1944 |
| 2,496,055 | King | Jan. 31, 1950 |

FOREIGN PATENTS

| Number | Country | Date |
| --- | --- | --- |
| 278,879 | Great Britain | Oct. 20, 1927 |
| 447,927 | Great Britain | May 28, 1936 |